(12) United States Patent
Christensen (10) Patent No.: US 7,832,139 B1
(45) Date of Patent: Nov. 16, 2010

(54) SLIP LINE APPARATUS FOR FISHING FLOAT

(76) Inventor: Everett B. Christensen, P.O. Box 612, Hawley, MN (US) 56549

( * ) Notice: Subject to any disclaimer, the term of this patent is extended or adjusted under 35 U.S.C. 154(b) by 147 days.

(21) Appl. No.: 11/295,938

(22) Filed: Dec. 7, 2005

(51) Int. Cl.
*A01K 91/00* (2006.01)
*A01K 93/00* (2006.01)
*A01K 95/00* (2006.01)

(52) U.S. Cl. .................. 43/44.87; 43/44.83; 24/908

(58) Field of Classification Search ............... 43/42.49, 43/44.87, 44.83, 44.84, 44.85, 42.74, 43.15, 43/42.29; 24/908, 129 R, 601.9, 601.8, 600.6, 24/343
See application file for complete search history.

(56) References Cited

U.S. PATENT DOCUMENTS

| | | | |
|---|---|---|---|
| 724,362 A * | 3/1903 | Wilson | 24/600.4 |
| 952,615 A * | 3/1910 | Harkins | 43/44.86 |
| 1,249,104 A * | 12/1917 | Johansen | 24/600.4 |
| 1,418,944 A | 6/1922 | Lower | |
| 1,438,264 A * | 12/1922 | Rygh | 24/600.6 |
| 1,713,041 A * | 5/1929 | Fey | 43/44.86 |
| 1,719,662 A * | 7/1929 | Jones | 24/600.4 |
| 1,850,748 A | 3/1932 | Foster | |
| 2,062,245 A * | 11/1936 | Arens | 24/601.8 |
| 2,379,676 A | 7/1945 | Blackstone | 43/49 |
| 2,444,790 A | 7/1948 | Stahnke et al. | 43/49 |
| 2,495,348 A * | 1/1950 | Roed | 24/600.4 |
| 2,525,067 A | 10/1950 | Dungan | 43/44.93 |
| 2,593,524 A | 4/1952 | Bechik | 43/44.93 |
| 2,756,478 A * | 7/1956 | Morrissey | 24/601.1 |
| 2,784,519 A * | 3/1957 | Ralston et al. | 43/44.98 |
| 3,004,319 A * | 10/1961 | Hennon | 24/598.5 |
| 3,023,535 A * | 3/1962 | Holka et al. | 43/43.1 |
| 3,030,726 A * | 4/1962 | Knapton | 43/44.93 |
| 3,184,880 A * | 5/1965 | Ratte | 43/44.86 |
| 3,421,341 A * | 1/1969 | Hodge | 63/4 |
| 3,462,807 A * | 8/1969 | Marquardt | 24/616 |
| 3,491,477 A * | 1/1970 | Karras et al. | 43/44.84 |
| 3,543,356 A * | 12/1970 | Zimmermann | 24/574.1 |
| 3,589,053 A | 6/1971 | Fynbo | 43/44.92 |
| 3,949,513 A | 4/1976 | Dmytriw | 43/44.93 |
| 4,665,595 A * | 5/1987 | Viot et al. | 24/616 |
| 4,914,849 A | 4/1990 | Hook | 43/42.08 |
| 4,986,023 A * | 1/1991 | Bucholz | 43/44.87 |
| 5,150,540 A * | 9/1992 | Bennett | 43/43.12 |
| 5,243,780 A | 9/1993 | Christensen | 43/44.87 |
| 5,404,668 A * | 4/1995 | Christensen | 43/44.87 |
| 5,490,348 A | 2/1996 | Serba | 43/44.93 |
| 6,484,435 B1 * | 11/2002 | Mosher | 43/43.1 |
| 6,857,221 B2 * | 2/2005 | Johnson | 43/44.87 |

FOREIGN PATENT DOCUMENTS

GB 2055419 A * 3/1981

* cited by examiner

*Primary Examiner*—Joshua J Michener
(74) *Attorney, Agent, or Firm*—Dietz Law Office LLC

(57) ABSTRACT

A slip clip line apparatus designed for use with fishing floats and sinkers to aid in their attachment to a fishing line. The slip clip has a slip body which engages the fishing line and allows the slip clip to slide freely along a predetermined length of fishing line. The slip body is a U-shaped apparatus having an open and centrally located line slip which is substantially closed. The slip clip further has a lower insertion body which may be connected to a piece of tubing that in turn may be connected to a float or a sinker.

13 Claims, 9 Drawing Sheets

SLIP LINE APPARATUS FOR FISHING FLOAT

BACKGROUND OF THE INVENTION

The present invention relates to an improvement in the manner by which fishing floats are attached to the fishing line in order to suspend bait at the desired depth. More specifically, to a manner of attaching a float to a fishing line so that it may freely pass along a predetermined section of the fishing line in a manner that allows it to be changed without the need of disassembling the slip line apparatus.

Fishing is an extremely popular form of recreation for millions of people today. A significant portion of the fishing population employs fishing floats frequently in their fishing activities. The use of a fishing float accomplishes two specific purposes. The first of these is to control the location of the offered bait in relation to the float and the bottom of the body of water. The benefits that this technique provides to the fisherman is to place the bait in the exact location within the body of water where the fish are most likely to be found. Thus, in certain circumstances the use of a fishing float increases the fisherman's chances of catching fish.

The second purpose of using a fishing float is for the monitoring of the line as they provide a good indication of the presence of a fish at the end of the line. This occurs because as a fish takes the bait, it causes the float to bob up and down on the surfaces of the water thereby alerting the fisherman to the presence of the fish. This allows the fisherman to set the hook at the proper time and reel the fish into the boat or onto shore.

While the use of a fishing float offers many advantages to the fisherman, they also suffer from a number of shortcomings that limit their usefulness. The first of these is that the fishing float imputes a degree of unnatural resistance at the point of the bait which can lessen its effectiveness as it can discourage a fish from taking the bait. In order to counteract this limitation, fisherman often attempt to tailor the size or style of the float being used to the specific fishing conditions or species of fish being sought. While this approach does lessen the impact of the float on the performance of the bait, it does not provide a means of entirely eliminating the resistance of the float and it can be time consuming and laborious and can therefore detract from the overall fishing experience.

An additional problem presented by the use of a fishing float is that it can make it more difficult to cast and retrieve the fishing line and bait. This problem is a result of the necessity of attaching the float to the fishing line at a predetermined distance from the bait. This situation often resulted in a relatively long section of fishing line between the float and the lure or bait. However, the attachment of the float made it impossible to retrieve this section of fishing line all the way back onto the fishing reel. This situation often resulted in a long section of line that had to be considered in both the casting and retrieval processes which also detracted from the fishing experience.

There have been numerous attempts to find a solution to the problems presented by the use of fishing floats. These generally involve a float device that is capable of sliding along the fishing line between the lure or bait at the terminal end of the line and a float stop which is attached to the fishing line at the desired location. This method of attachment allows the float to travel along the length of this section of line depending upon which part of the fishing process one is engaged in. When the lure and bait is properly deployed, the float slides up the line and engages the stop which in turn suspends the lure at the desired depth. Conversely, when the line is reeled in the float is free to pass down the line until it engages the lure thereby allowing the line to be fully retrieved. However, this solution still suffers from the limitation of requiring the fisherman to disassemble the entire float and lure assembly to alter the size or style of the float being used. As a consequence of this situation, a better solution to the limitations of the fishing float is still needed.

Finally, the use of a fishing float is often enhanced by the attachment of a light to the float. The use of the light allows the fisherman to employ the advantages of the fishing float after nightfall by providing a means of visibly monitoring it after dark. However, the attachment of the light to the float can be problematic as it may interfere with the float's ability to slide along the fishing line. Thus, while the attachment of a light to the float provides some advantages it also has its limitations as it can adversely affect the fishing float's slip function.

Another common problem associated with the use of slip fishing floats is encountered while ice fishing. This problem stems from the formation of ice at the point where the fishing float engages the fishing line. The ice can act to tie the line and float together thereby eliminating the advantages offered by the use of a slip float. The reason that this occurs is that even inside of a heated ice fish house the surface of the water tends to freeze over time resulting in the above described situation. Thus, while the use of slip fishing floats can provide benefits in ice fishing, their design requires constant maintenance to ensure their proper operation.

Therefore, it can be seen that it would be desirable to provide a means of attaching a fishing float to a fishing line in such a manner so that it may be easily and quickly attached and removed without the need of disassembling the entire fishing apparatus. Additionally, it can be seen that it would be desirable to provide such a means of attaching a fishing float to a fishing line that would allow the fishing float to freely slide along a predetermined section of the fishing line defined by the fishing apparatus. It can also be seen that it would be desirable to provide such a means of attaching a fishing float to a fishing line that would allow for the attachment of a night fishing light in such a manner that would not interfere with the fishing float's ability to slide along the predetermined section of fishing line. Finally, it can be seen that it would be desirable to provide such a means of attaching a slip fishing float to a fishing line that would avoid the freeze up problems associated with the use of fishing floats in ice fishing situations.

SUMMARY OF THE INVENTION

It is the primary objective of the present invention to provide a means of attaching a fishing float to a fishing line in such a manner so that it may be easily and quickly attached and removed without the need of disassembling the entire fishing apparatus.

It is an additional objective of the present invention to provide such a means of attaching a fishing float to a fishing line that would allow the fishing float to freely slide along a predetermined section of the fishing line defined by the fishing apparatus.

It is a further objective of the present invention to provide such a means of attaching a fishing float to a fishing line that would allow for the attachment of a night fishing light in such a manner that would not interfere with the fishing float's ability to slide along the predetermined section of fishing line.

It is a still further objective of the present invention to provide such a means of attaching a fishing float to a fishing line that would provide a means of attaching a slipping fishing float to a fishing line that would avoid the freeze up problems associated with the use of fishing floats in ice fishing situations.

These objectives are accomplished by the use of a slip line apparatus that is designed specifically for use with fishing floats in common use today. As such, the present invention is primarily composed of two major components. The first of these is the slip body which is the component that engages the fishing line and allows the present invention to slide freely along a predetermined length of fishing line. To accomplish these purposes, the slip body is composed of a U-shaped apparatus having an open and centrally located line slip which is substantially closed at its inner end. This method of construction of the line slip allows the fishing line to be contained within it without fixing it directly to the fishing line thereby allowing for the attachment of a fishing float in a manner so that it may freely slide along a predetermined section of the fishing line.

The second major component of the present invention is the insertion body. The insertion body is the component of the invention used to attach it to a fishing float. To accomplish this, the insertion body is constructed so that its outside diameter is roughly the same size as the outside diameter of the central shaft of a fishing float. The connection between the two is then facilitated by the use of an attachment sleeve that has an inside diameter that is equal to the outside diameter of the insertion body and float's central shaft. The insertion body is then forced into the attachment sleeve to roughly its central point leaving the other half free to accept the lowest most portion of the float shaft. Thus, the use of the attachment sleeve provides a means of forming a frictional fitting between the present invention and a fishing float.

The boundary between the slip body and the insertion body is formed by a plurality of extending insertion stops. The insertion stops functions to stop the insertion body with relation to the attachment sleeve and float shaft at the proper point to both provide an adequate connection and to allow for the proper performance of the line slip during fishing operations. This connection not only attaches the present invention to a fishing float in a manner that is secure, but also provides a means by which it can be quickly and easily removed to allow the float to be changed when necessary.

The insertion body of the present invention also contains two other components which are necessary for proper operation. The first of these is the line passage. The line passage is a gap running longitudinally along the central axis of the insertion body from the inner end of the line slip to its outward end. The line passage allows an unbroken section of fishing line to be either inserted into or removed from the line slip. This is accomplished by removing the insertion body from its engagement with the float shaft. With this step complete, the line passage provides a pathway of access to the slip line through which the unbroken line may be directed. Once the desired function has been performed, the insertion body's connection to the float shaft through the attachment sleeve may be reestablished to connect the fishing float.

The second component of the present invention associated with the insertion body is the anti-snag depression. The anti-snag depression is an extension of the line slip that protrudes into the insertion body beyond the insertion stops. The practical result of this is that the inner boundary of the line slip is formed by the edge of the attachment sleeve. The purpose of the anti-snag depression is to ensure that the fishing line will not engage the inner end of the line passage during use; a situation that may cause the fishing line to snag and prevent the fishing float from slipping freely along the line in its intended manner.

In its general manner of construction the insertion body is cylindrical having two opposing tapers on its terminal end which aid in its insertion into the attachment sleeve. However, a plurality of alternative embodiments of the present invention have been contemplated which employ insertion bodies of varying design. The first of these is the lobed slip clip in which the outer surface of the insertion body is made up of a plurality of lobes each of which engage the attachment sleeve. The second alternative embodiment is the square slip clip in which the insertion body is made up of square components of the corners of which are used to engage the inner surface of the attachment sleeve. A third variation is a cylindrical insertion body have a plurality of longitudinally oriented gripping depressions. The use of these alternative embodiments of the present invention may offer advantages over the previous embodiment in certain fishing conditions but in all other aspects of their construction and operation they are the same as described above.

The use of the present invention in conjunction with slip fishing floats also enhances the performance of these systems in ice fishing conditions. This is a result of the manner by which the present invention attaches to a fishing line and the operational characteristics this imparts to fishing floats. When the lure is deployed at the desired depth, its weight interacts with the present invention which in turn imparts an upright orientation to the fishing float. As a result of the present invention's position relative to the fishing float, this causes the connection between the present invention and the fishing line to be well below the surface of the water thereby eliminating the problems associated with line freeze up.

The design of the present invention also facilitates the use of auxiliary lighting devices which enable the use of fishing floats in low light or night fishing. The reason for this is that it provides a method of attaching a slip float to a fishing line that does not use the float's hollow shaft for attachment. As a result of this, the upper portion of the float's shaft is left free thereby providing a point of positioning a light. This is generally accomplished by the use of a small cylindrical light such as a battery and diode combination or a chemical light that is inserted into the upper most portion of the shaft.

Finally, an additional use of the present invention has been contemplated in which it is used to attach a fishing sinker in a slidable manner to a fishing line. This is accomplished by engaging the present invention to the fishing line in a position that is above a swivel connector or a line stop apparatus. The other end of the swivel connector then provides for the point of attachment for an additional section of fishing line to which is attached the hook and bait. This method of fishing allows the bait to be positioned accurately on or near the bottom of a body of water when it is desirable to do so.

This method of attachment serves to position the sinker at a point along the fishing line in a manner that allows it to anchor the line to the bottom of a body of water while still providing a means by which the bait and hook can be presented effectively. Additionally, the slidable nature of the attachment imparts less resistance to the movement of the hook and bait resulting in a more realistic presentation and, therefore, a more effective fishing method.

The attachment of the sinker to the present invention is accomplished in the same manner as described above for the other variants of the present invention. Additionally, the sinkers used in this are of a bowling pin type having a relatively large rounded bottom and a relatively small rounded top. In the attachment process, the smaller top is inserted into the open end of the attachment sleeve securing the sinker to the present invention. This method of attachment not only makes the attachment of a slip sinker to a fishing line a simple process, but makes the changing of sinkers of varying weights to fit changing conditions easy as well.

For a better understanding of the present invention reference should be made to the drawings and the description in which there are illustrated and described preferred embodiments of the present invention.

DESCRIPTION OF THE PREFERRED EMBODIMENT

Figure 1:
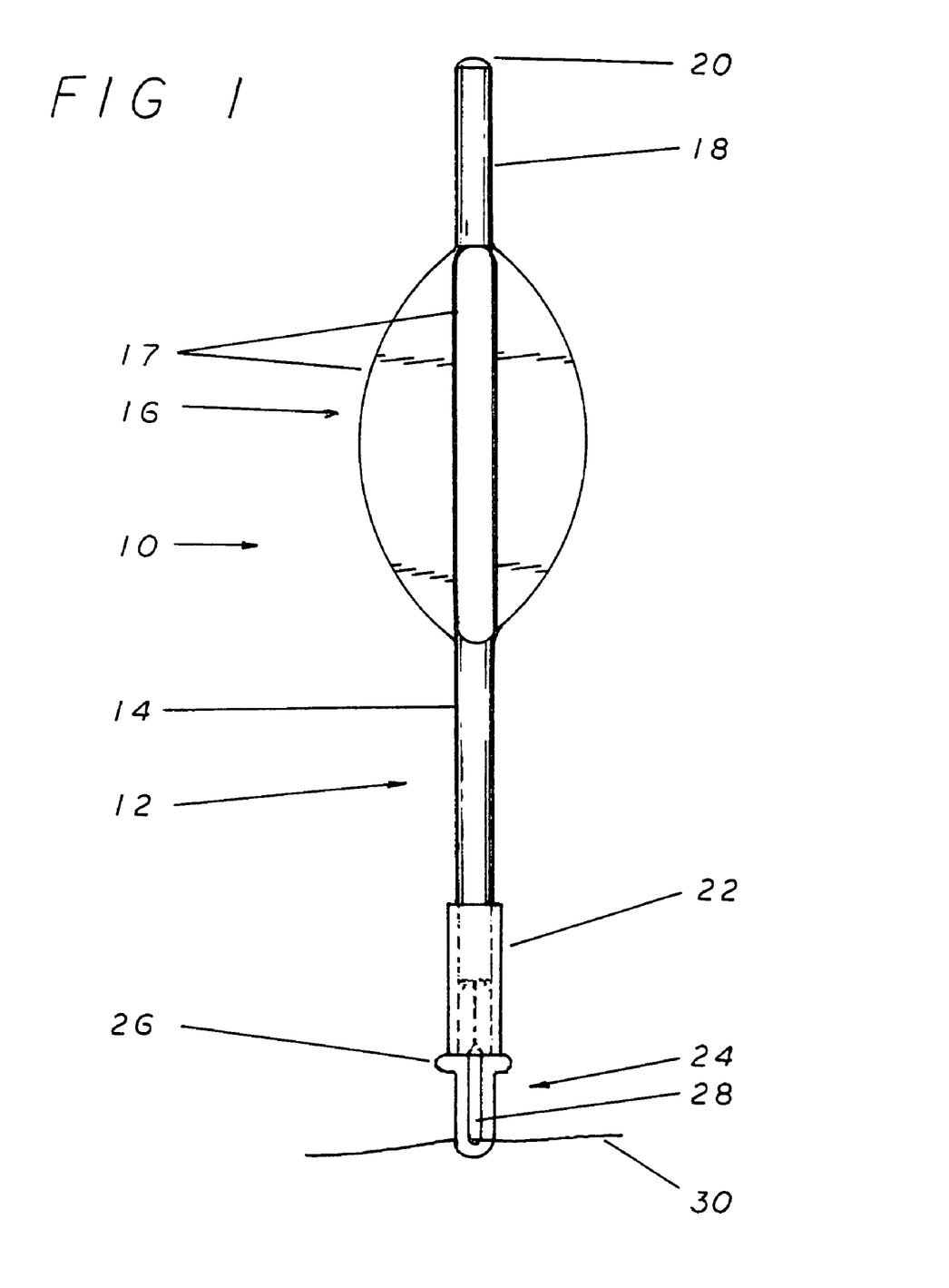
FIG. 1 is a side elevation view of the present invention as used in conjunction with a common fishing float and illustrating the manner in which it is employed to connect the float to a fishing line.
Figure 2:
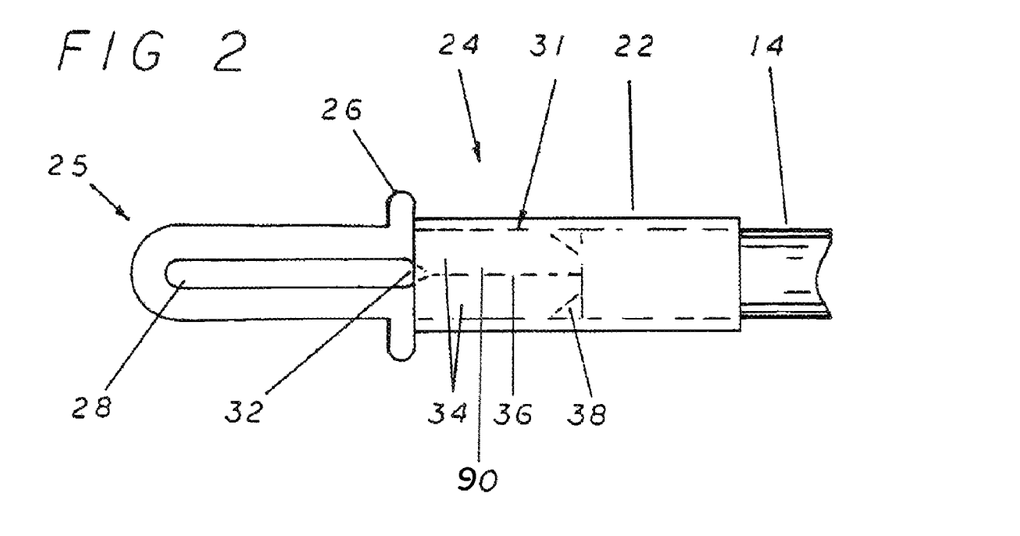
FIG. 2 is a side elevation view of the present invention illustrating its manner of construction and the method employed to connect it to a fishing float.
Figure 3:
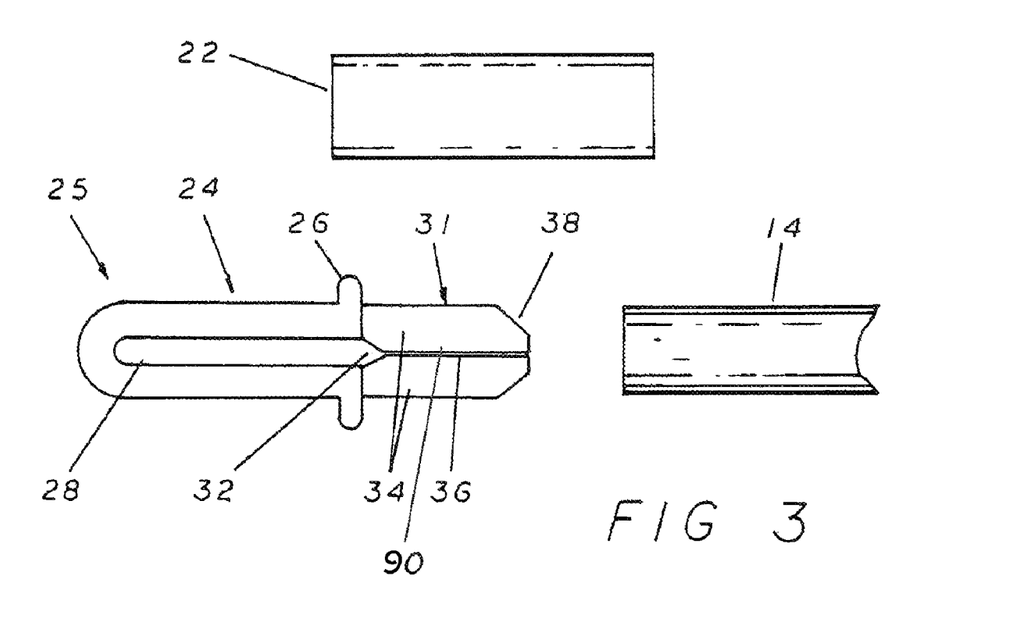
FIG. 3 is a side elevation exploded view of the present invention of FIG. 2 illustrating the manner of construction of its major components.
Figure 4:
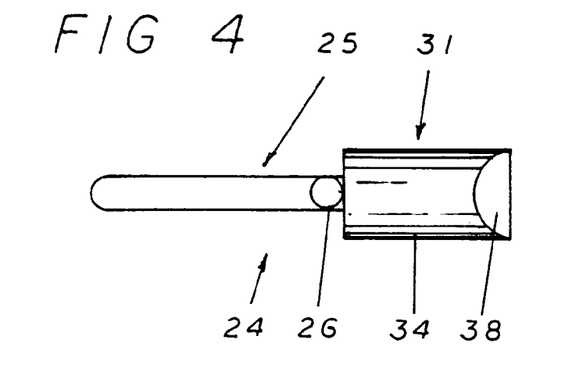
FIG. 4 is a top elevation view of the present invention of FIG. 2.
Figure 5:
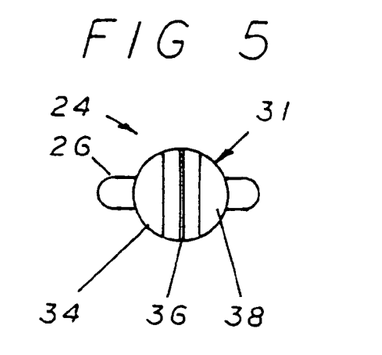
FIG. 5 is a front elevation view of the present invention of FIG. 2.
Figure 6:
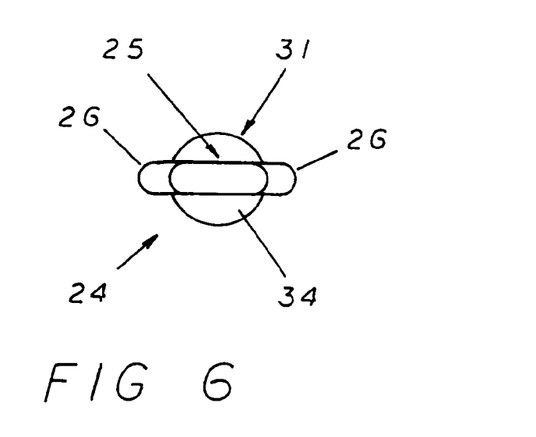
FIG. 6 is a rear elevation view of the present invention of FIG. 2.
Figure 7:
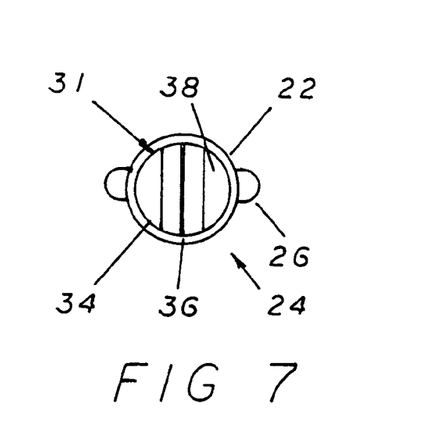
FIG. 7 is a front elevation view of the present invention of FIG. 2 and illustrating it as engaged within the attachment sleeve.

Referring now to the drawings, and more specifically to FIG. 1, the slip clip 24 is illustrated as used in conjunction with a typical fishing float 12 and engaging a fishing line 30 thereby forming a slip line apparatus 10. This FIGURE illustrates the present invention as used with a common form of fishing float 12 having a centrally positioned hollow float shaft 14 and a float body 16. The float body 16 in this example is made up of a plurality of float wings 17 that radiate outward from the float shaft 14 and which are constructed of a low density material in order to provide the necessary buoyancy to the fishing float 12. It is important to note that while the present invention is depicted as used with a specific type of fishing float 12 it will work equally as well with most of the fishing floats 12 commonly used today.

The slip line apparatus as illustrated is composed of the fishing float 12 the bottom of which provides the point of attachment for the present invention. This attachment is accomplished by the use of an attachment sleeve 22. The attachment is accomplished in such a manner so that the present invention's clip body 25 extends out of the attachment sleeve 22 beyond the insertion stops 26. In this configuration the line slip 28 is positioned so that the fishing line 30 can be passed through to achieve the desired slip connection.

Additionally, the upper surface of the fishing float 12 provides the point of attachment for the light shaft 18. The light shaft 18 provides the use of the present invention with night fishing capabilities by positioning a light diode 20 or other light source in a highly visible position when the slip line apparatus 10 is deployed.

The manner of construction of the present invention and its connection to the float shaft 14 of the fishing float 12 are further illustrated in FIGS. 2, 3, 4, 5, 6, and 7. As described above, an attachment sleeve 22 is employed to make the attachment between the slip clip 24 and float shaft 14. The attachment sleeve 22 is typically a short piece of flexible tubing having an inside diameter that is equal to the outside diameters of the insertion body 31 of the slip clip 24 and the float shaft 14. By engaging the insertion body 31 and the float shaft 14 from opposite sides into the attachment sleeve 22 a frictional fitting is formed effectively tying these components together. Additionally, the use of the frictional fitting enables the components to be quickly assembled and disassembled further enhancing the usefulness of the present invention.

As illustrated, the position of the slip clip 24 relative to the attachment sleeve 22 is controlled by the insertion stops 26 which limit the travel of the insertion body 31 into the attachment sleeve 22. The use of the insertion stops 26 ensures that both the insertion body 31 and the float shaft 14 will be properly positioned within the attachment sleeve 22 to form a proper connection. Additionally, the most forward end of the engagement pins 34 that make up the insertion body 31 are equipped with tapers 38 that allow for easier insertion of the slip clip 24 into the attachment sleeve 22.

The forward portion of the slip clip 24 is made up of the clip body 25. The clip body 25 is the component of the present invention that is employed to engage the fishing line 30 in a slidable manner. The clip body 25 is made up of a generally U-shaped component that is substantially closed at its inner end by the insertion stops 26 and the insertion body 31. This configuration forms the line slip 28 which is defined by the open interior space. The line slip 28 is the component of the present invention which contains the fishing line 30 during fishing operations. Access to the line slip 28 is gained through the line passage 36. The line passage 36 is a gap between the engagement pins 34 of the insertion body 31. As illustrated, the line passage 36 is exposed when the insertion body 31 is removed from the attachment sleeve 22 thereby allowing the fishing line to be either placed in or removed from the line slip 28. With this accomplished, the insertion body can then be reinserted into the attachment sleeve 22 to complete the operation. This manner of construction provides the basis for the present invention as it allows for the quick and easy changing of the fishing float 12 to fit the encountered fishing conditions. Additionally, the flexibility offered by the use of the attachment sleeve 22 allows the present invention to be used with a large number of fishing floats 12 of varying sizes and designs.

The upper end of the line slip 28 is equipped with an anti-snag depression 32 which is a V-shaped extension of the line slip 28 that protrudes into the insertion body 31 terminating at the forward end of the line passage 36. The purpose of the anti-snag depression 32 is to ensure that the fishing line 30 does not become stuck in the opening of the line passage 36 during operations. To accomplish this, the anti-snag depression 32 extends beyond the rear limits of the insertion stops 26 so that, when the present invention is completely assembled, the effective rear end of the line slip 28 is formed by the inner edge of the attachment sleeve 22. This configuration ensures that the fishing line 30 cannot become snagged in the line passage 36 thereby ensuring that the sliding characteristics of the fishing float 12 will not be impeded.

Figure 12:
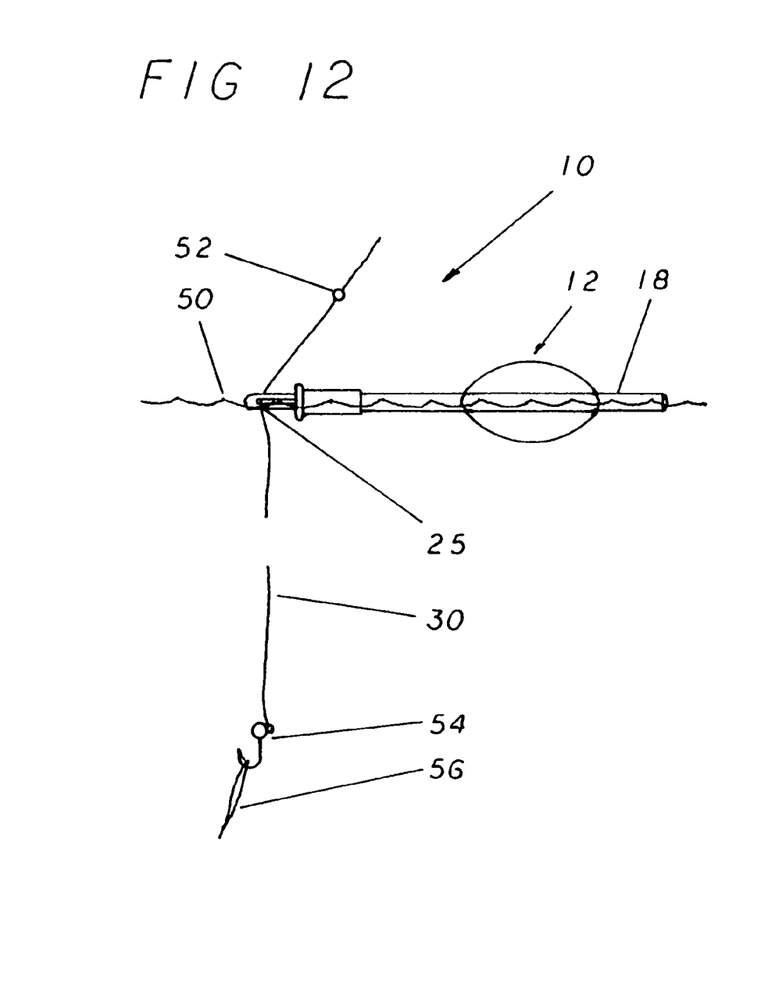
FIG. 12 is a side elevation view of the present invention as used in conjunction with a fishing float illustrating their orientation relative to the surface of the water prior to the engagement of the float stop.
Figure 13:
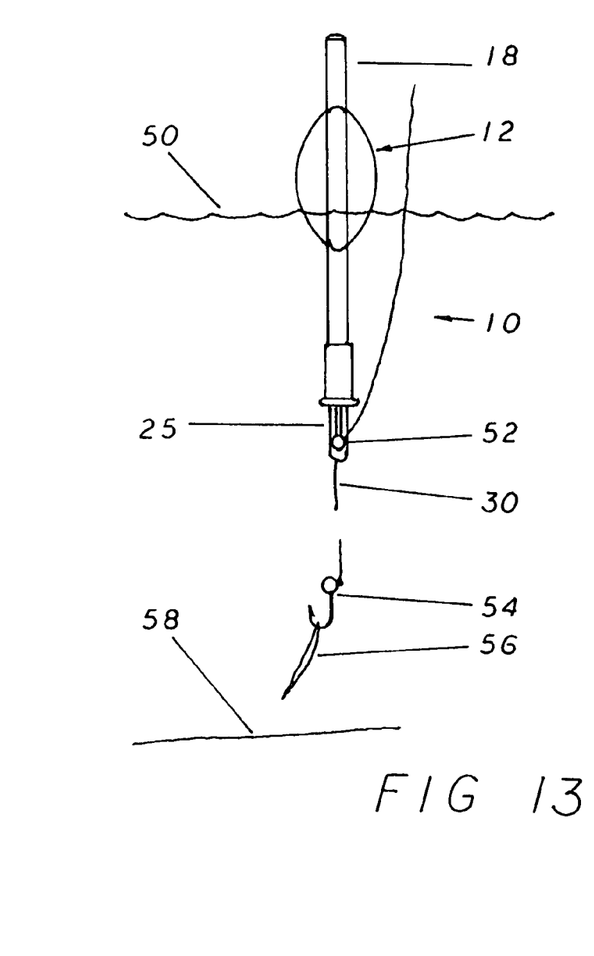
FIG. 13 is a side elevation view of the present invention of FIG. 12 illustrating their orientation after the engagement of the float stop.

The manner of operation of the present invention when employed as a component of a slip line apparatus 10 is further detailed in FIGS. 12 and 13. When initially deployed (FIG. 12), the fishing float 12 lays flat on the surface of the water 50 while the lure 54 and bait 56 sink towards the desired depth. During this phase, the fishing line 30 is free to pass through the clip body 25 facilitating this procedure. However, to control the depth at which the lure 54 and bait 56 are deployed, a float stop 52 is placed on the fishing line 30 in a predetermined location above the fishing float 12. The purpose of the float stop 52 is to stop the passage of the fishing line 30 through the clip body 25 of the present invention. Once this has occurred (FIG. 13), the weight of the lure 54 and bait 56 pull the fishing float 12 into an upright position in relation to the water surface 50 while positioning the lure 54 and bait 56 in the desired position relative to the bottom 58 of the body of water being fished.

The upright position obtained by the fishing float 12 in this configuration is desirable for a plurality of reasons. The upright fishing float 12 offers less resistance to a fish investigating the bait 56 and is therefore more natural and produces better results. Additionally, the upright fishing float 12 also provides better signaling characteristics to the fisherman for the same reasons. Also, the placement of the present invention beneath the surface of the water 50 ensures that the point of connection between the invention and the fishing line 30 will not be subject to freeze up in ice fishing conditions. Finally, the design of the present invention and the resulting orientation it bestows on the slip line apparatus 10 allows for the positioning of a light shaft 18 on the upper surface of the fishing float 12 where it is the most visible without interfering with the slidable nature of the fishing line 30 connection.

Figure 8:
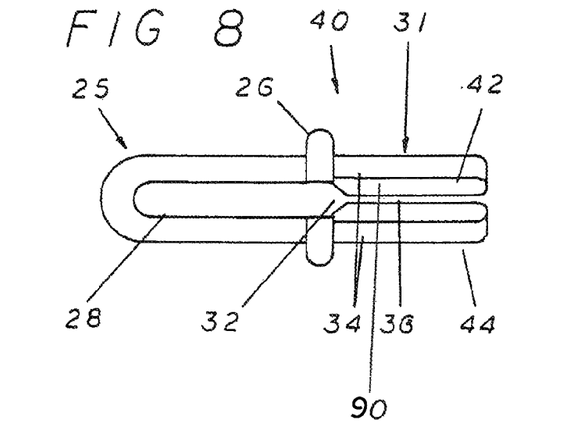
FIG. 8 is a side elevation view of an alternative embodiment of the present invention in which the insertion body is lobe shaped.
Figure 9:
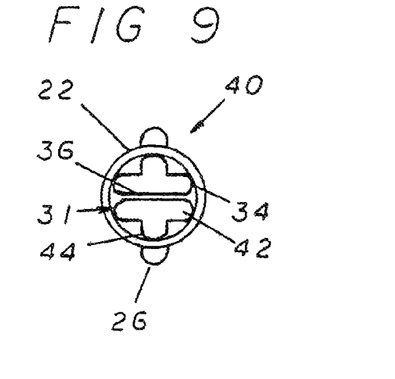
FIG. 9 is a front elevation view of an alternative embodiment of the present invention of FIG. 8 and illustrating it as engaged within the attachment sleeve.

An alternative embodiment of the present invention is illustrated in FIGS. 8 and 9. This embodiment employs a lobed slip clip 40 wherein the insertion body 31 is made up of engagement pins 34 containing a plurality of horizontal and vertical engagement lobes, 42 and 44. The horizontal and vertical engagement lobes, 42 and 44, are the components of the lobed slip clip 40 which are used to engage the inner surface of the attachment sleeve 22 to form the necessary frictional fitting. The use of the lobed slip clip 40 provides enhanced fitting characteristics in certain conditions but in all other operational aspects, the lobed slip clip 40 functions in the manner as described for the previous embodiment of the present invention.

Figure 10:
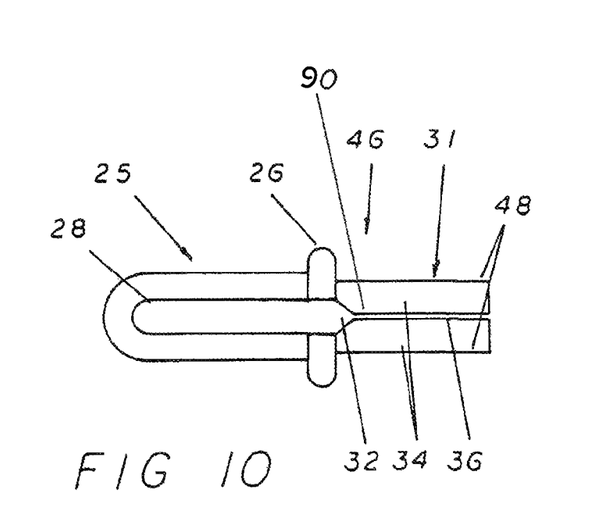
FIG. 10 is a side elevation view of an alternative embodiment of the present invention in which the insertion body is square shaped.
Figure 11:
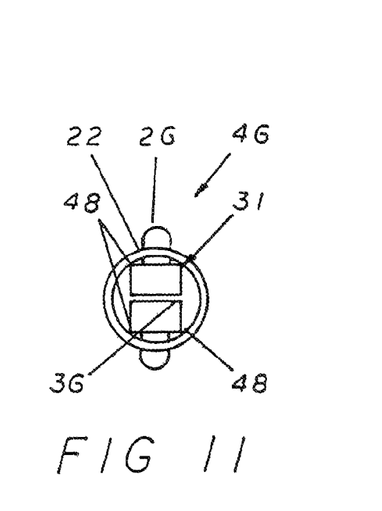
FIG. 11 is a front elevation view of the present invention of FIG. 10 and illustrating it as engaged within the attachment sleeve.

A further alternative embodiment of the present invention is illustrated in FIGS. 10 and 11. This embodiment employs a square slip clip 46 wherein the insertion body 31 is made up of engagement pins 34 having square corners 48. The square corners 48 off the engagement pins 34 are the components of the square slip clip 46 that engage the inner surface of the attachment sleeve 22 in the assembled configuration. The use of the square corners 48 for this purpose can increase the tension of the frictional fitting as they tend to bite into the attachment sleeve 22. This increased friction can also be advantageous in certain fishing conditions. In all other aspects of its operation, the square slip clip 46 operates in the same manner as described for the original embodiment of the present invention as described above.

Figure 14:
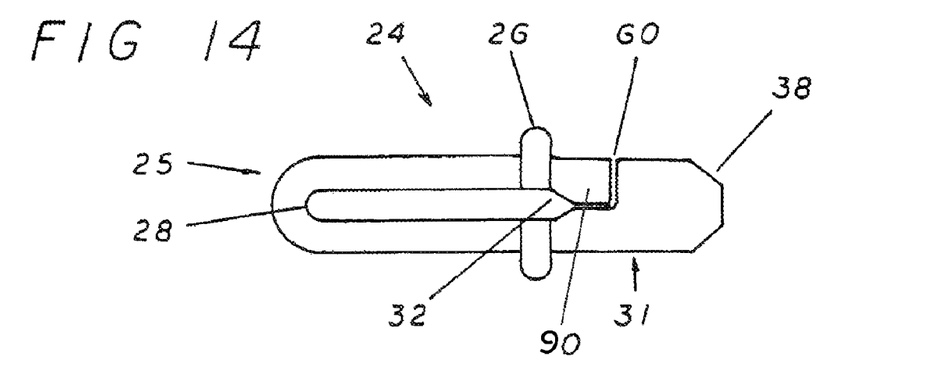
FIG. 14 is a side elevation view of an alternative embodiment of the present invention employing the use of a J line passage.
Figure 15:
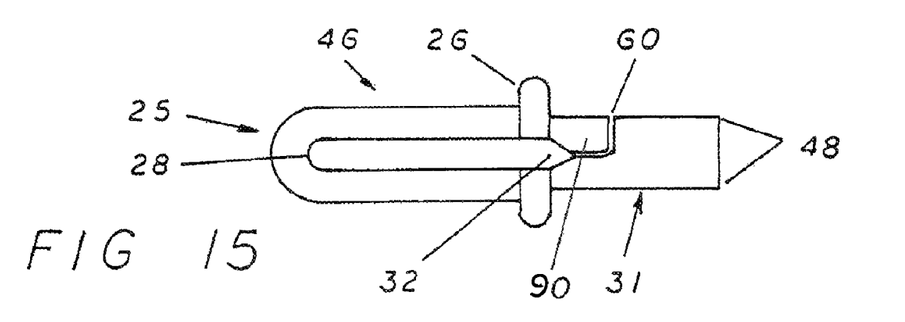
FIG. 15 is a side elevation view of an alternative embodiment of the present invention employing the use of a J line passage in conjunction with a square slip clip.
Figure 16:
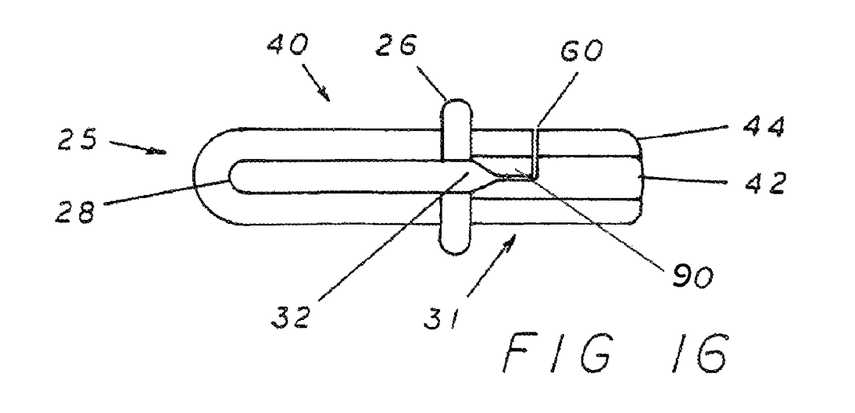
FIG. 16 is a side elevation view of an alternative embodiment of the present invention employing the use of a J line passage in conjunction with a lobed slip clip.

A still further embodiment of the present invention is illustrated in FIGS. 14, 15, and 16. In this embodiment, the line passage 36 has been altered to form a J-line passage 60. The J-line passage 60 functions in the same manner as the line passage 36 as described above except that just forward of its connection with the anti-snag depression 32 it makes a right angle turn and exits the insertion body 31 on the side. The purpose of the J-line passage 60 is to allow for the removal or insertion of the fishing line 30 into the line slip 28 without the necessity of completely disengaging the insertion body 31 from the attachment sleeve 22. This design further enhances the benefits provided by the present invention as provides an even more efficient mechanism for changing the fishing float 12 being used in the slip line apparatus 10. As illustrated, the J-line passage 60 is adaptable for use in the slip clip 24, the square slip clip 46, and the lobed slip clip 40. In all other aspects of its operation and construction, the slip clip 24 employs a J-line passage 60 function and is manufactured in the same manner as described for all previous embodiments of the present invention.

Figure 17:
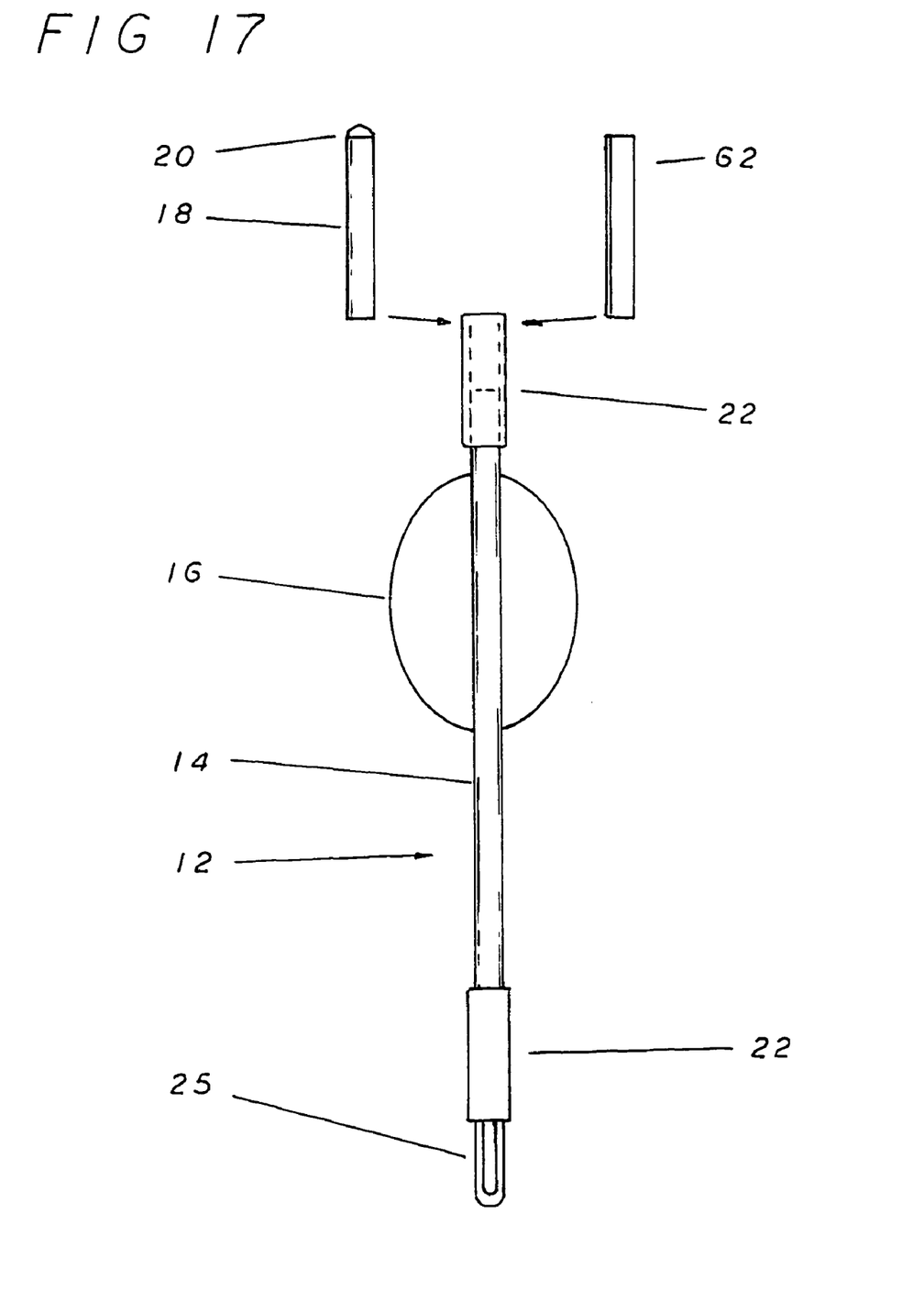
FIG. 17 is a side elevation exploded view of the upper portion of the slip fishing float illustrating the manner employed to attach a light source to the float.

The use of the present invention in conjunction with a slidable fishing float 12 provides a means of employing a light shaft 18 when necessary as further detailed in FIG. 17. The primary reason that the positioning of the light shaft 18 on the top of the fishing float 12 is possible is that the use of the present invention frees up the float shaft 14 which is normally used to pass the fishing line through in a slip line fishing configuration. This allows for the positioning of an additional attachment sleeve 22 to the upper end of the float shaft 14 which allows for the attachment of light shaft 18 by inserting it into the open end of the inserted attachment sleeve 22. The most common type of light shaft employed for this purpose is a diode 20 placed on the tip of the light shaft 18 and which contains an internal battery. In this design, the diode 20 is turned off and on by depressing and rotating it to either the on or off position. Alternatively, a small cylindrical chemical light 62 may also be employed for this purpose. A chemical light 62 is a common device containing two chemicals that illuminate upon mixing which can then be inserted into the open float shaft 14 to provide the desired light for low light fishing.

Figure 18:
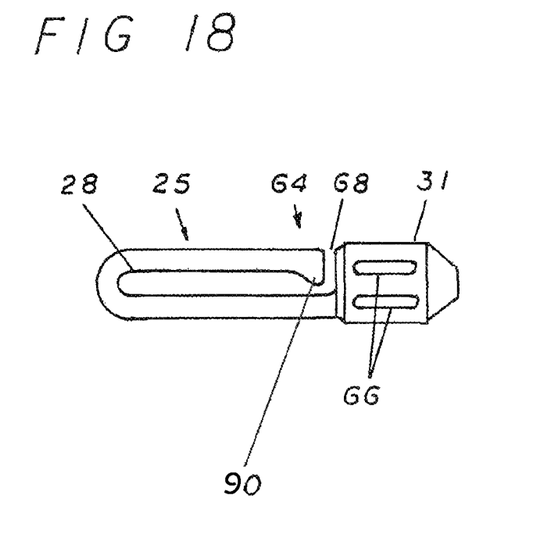
FIG. 18 is a side elevation view of an alternative embodiment of the present invention in which the insertion body is cylindrically shaped and having a plurality of longitudinally oriented gripping depressions.
Figure 19:
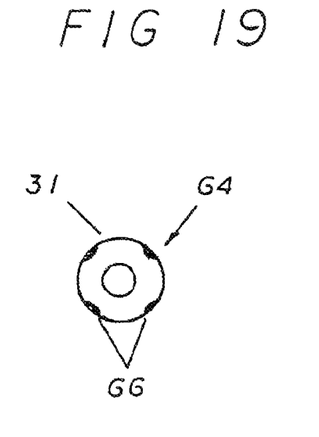
FIG. 19 is a front elevation view of the alternative embodiment of the present invention of FIG. 18.

An additional embodiment of the present invention is illustrated in FIGS. 18 and 19 and uses a grooved slip clip 64. This embodiment of the present invention employs an insertion body 31 that is cylindrical in shape and which has a plurality of longitudinally oriented grip grooves 66. The grip grooves 66 serve to engage the internal surface of the attachment sleeve 22 to secure the connection of the two as described above for the previous embodiments of the present invention. Additionally, the established connection is secure enough with this design as to eliminate the need for the use of the insertion stops 26 that are used in all other embodiments.

The clip body of the grooved slip clip 64 also varies slightly than those described above. As opposed to the situation in which the line slip 28 is accessed through an opening in the insertion body 31, the line slip 28 of the grooved slip clip 64 is accessed through a line slip opening 68 in the clip body 25. The elimination of the insertion stops 26 allows the attachment sleeve 22 to be passed over the grooved slip clip 64 to the point where it covers the line slip opening 68. This not only ensures that the fishing line 30 will stay properly engaged, but simplifies the construction of the present invention.

It has been found that the design of the grooved slip clip 64 works as well, if not better than, all of the other previous embodiments while offering the added advantages of simplicity in design and reduced production costs. In all other respects the grooved slip clip 64 operates substantially the same as described for the previous embodiments of the present invention.

As shown in FIGS. 2, 3, 8, 10, 14, 15, 16, 18, 22 crimp stop 90 restricts a first end of a U shaped arm of the slip clip 24 from contact with a second end of the U shaped arm of the slip clip 24.

Figure 20:
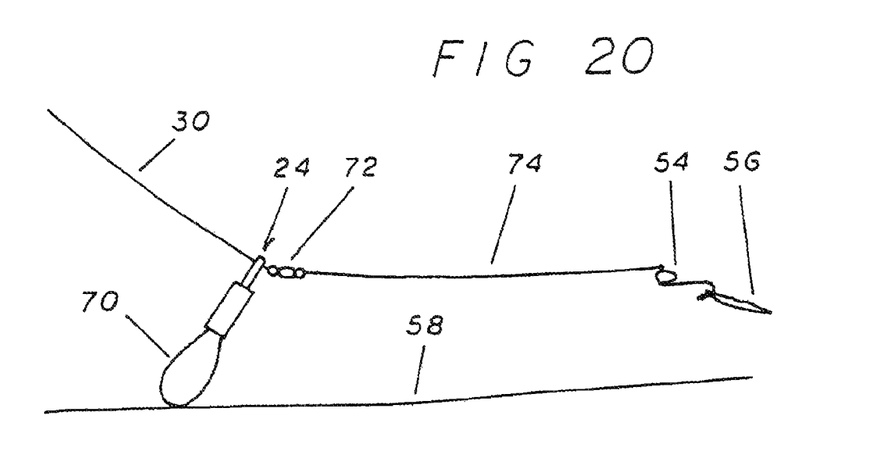
FIG. 20 is a side elevation view of the present invention as used in conjunction with a fishing sinker illustrating their orientation when deployed in relation to the bottom of a body of water.
Figure 21:
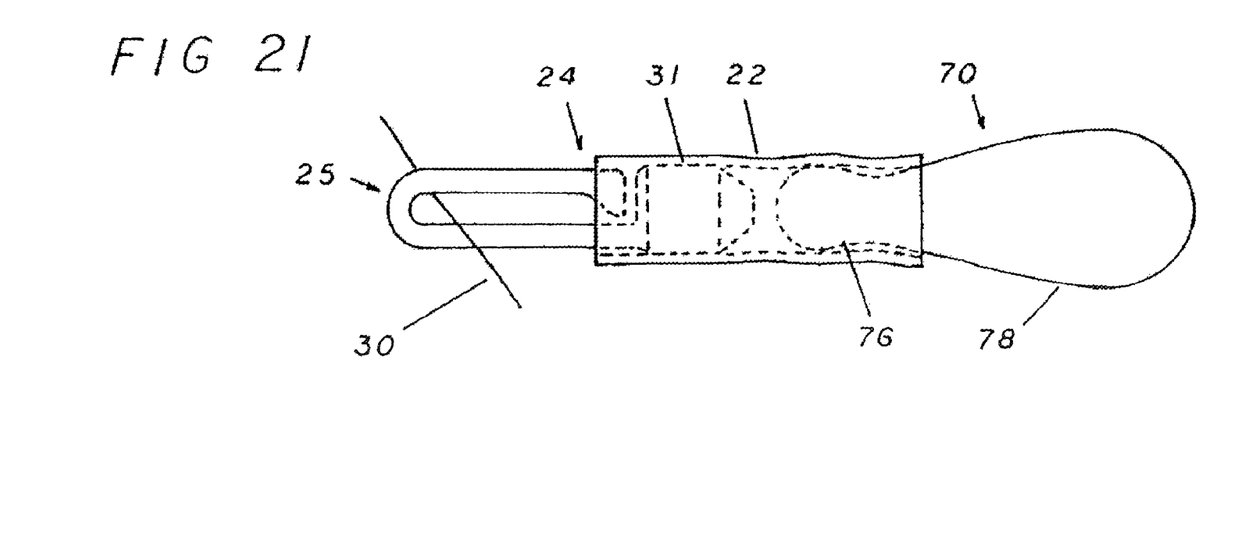
FIG. 21 is a side elevation view of the present invention as used in conjunction with a fishing sinker.
Figure 22:
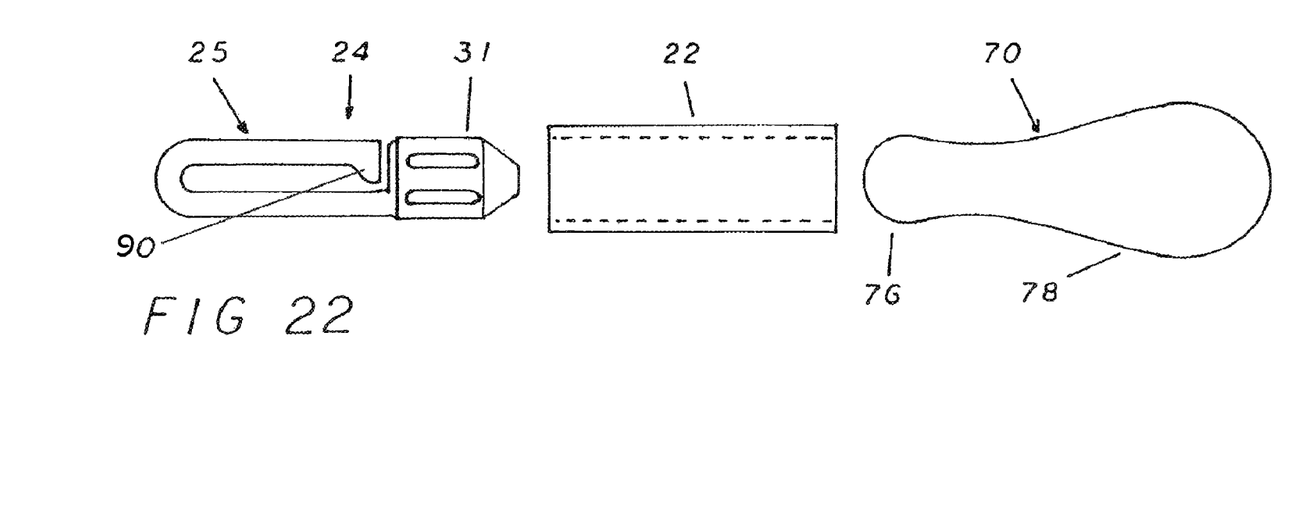
FIG. 22 is a side elevation exploded view of the present invention as used in conjunction with a fishing sinker and illustrated the manner by which the sinker is attached to slip body.

Finally, it has been found to be advantageous to employ the present invention to attach a sinker 70 to a fishing line 30. The manner by which this attachment is accomplished is illustrated in FIGS. 20, 21, and 22. The use of a sinker 70 in a fishing application is primarily for the purpose of positioning the lure 54 and/or bait 56 close to the bottom 58 of a body of water. To accomplish this, a sinker 70 is attached to the fishing line 30 in a position that effectively secures the lure 54 and/or bait 56 in the desired location.

In this application, the sinker 70 is attached to the fishing line 30 by the use of a slip clip 24 and a swivel connector 72. To accomplish this, the slip clip 24 is secured to the fishing line 30 by the methods described above in a position that is above the point where the fishing line 30 is attached to the swivel connector 72. This method of attachment allows the slip clip 24 and sinker 70 to slide along the fishing line 30 to any point above the swivel connector 72. The swivel connector 72 then provides for the attachment of a leader 74 to which the lure 54 and/or bait 56 are attached. This is important to the effectiveness of the fishing equipment as it means that a fish may take the offered bait 56 without the resistance of the sinker 70 affecting the action of the bait 56.

The sinker 70 used in conjunction with the present invention is shaped similar to a bowling pin. This means that the sinker 70 has a smaller rounded sinker insertion end 76 and a larger rounded sinker weight end 78. To attach the sinker to the fishing line 30 the sinker insertion end 76 is pressed into the open end of an attachment sleeve 22 that has been fitted to a slip clip 24 as described above. This positions the sinker weight end 78 of the sinker 70 properly so that it can operate to deploy the lure 54 and/or bait 56 as required by the encountered fishing conditions.

The use of the present invention for the attachment of sinkers 70 also provides other benefits to the user. The first of these is that it provides a means by which sinkers 70 can be easily and quickly added or removed from an existing fishing setup. Also, the nature of the present invention allows the user to easily change between sinkers 70 of varying weights to adjust their presentation to fit changing conditions.

Although the present invention has been described in considerable detail with reference to certain preferred versions thereof, other versions are possible. Therefore, the spirit and scope of the appended claims should not be limited to the description of the preferred versions contained herein.

What is claimed:

1. A slip clip apparatus for use on a fishing line said slip clip apparatus comprising:
    an insertion body;
    a clip body, said clip body having a U shaped arm forming a line slip opening, said U shaped arm having a proximal end, a bottom, and a distal end, said proximal end of said U shaped arm connected at a first portion of said insertion body, said bottom of said U shaped arm spaced apart from and opposing said first portion of said insertion body, and said distal end of said U shaped arm at least aligned to a second portion of said insertion body, such that a line passage is defined for sliding said fishing line into said line slip opening away from a terminal end of said fishing line;
  a crimp stop that restricts the proximal end of said U shaped arm from contact with said distal end of said U shaped arm; and
    an elongated attachment sleeve tubing having a first end and a second end opposite of said first end, wherein said first end frictionally fits over said insertion body and said second end is positioned away from said slip clip apparatus when said first end fits over said insertion body;
    wherein said elongated attachment sleeve tubing is comprised of a flexible material.

2. A slip clip apparatus as in claim 1 wherein said attachment sleeve tubing closes said line passage when said attachment sleeve tubing is friction fit over said insertion body and at least a portion of said clip body.

3. A slip clip apparatus as in claim 2 further comprising a plurality of grip sections for increasing the friction fit between said insertion body and said elongate attachment sleeve.

4. A slip clip apparatus as in claim 3 wherein said distal end of said U shaped arm terminates before said insertion body to form said line passage between said U shaped arm and said insertion body.

5. The apparatus of claim 1, wherein the second end of said attachment sleeve tubing frictionally fits over at least one of a fishing float, a fishing float having an auxiliary lighting device, and a fishing sinker.

6. A slip clip apparatus for use on a fishing line said slip clip apparatus comprising:
    a substantially cylindrical insertion body;
    a clip body, said clip body having a U shaped arm, said U shaped arm having a proximal end, a bottom, and a distal end, said clip body connected at said proximal end of said U shaped arm to said insertion body, said bottom of said U shaped arm spaced apart and opposing said insertion body, and said distal end of said U shaped arm terminates before said insertion body so as to define a line passage between said U shaped arm and said insertion body for sliding said slip clip apparatus on said fishing line, wherein said slip clip apparatus attaches onto said fishing line through said line passage allowing for the placement and removal of said fishing line away from a terminal end of said fishing line;

a crimp stop that restricts the proximal end of said U shaped arm from contact with said distal end of said U shaped arm;

an elongated attachment sleeve tubing having a first end and a second end opposite of said first end, wherein said first end frictionally fits over said insertion body and at least a portion of said clip body, said second end positioned away from said slip clip apparatus when said first end fits over said insertion body; and wherein said elongated attachment sleeve tubing is comprised of a flexible material.

7. A slip clip apparatus as in claim 6 wherein said attachment sleeve tubing closes said line passage when said attachment sleeve tubing is friction fit over said insertion body and at least a portion of said clip body.

8. A slip clip apparatus as in claim 7 wherein said insertion body includes a plurality of grip sections for increasing the friction fit between said insertion body and said elongate attachment sleeve.

9. A slip clip apparatus as in claim 8, wherein said second end of said attachment sleeve tubing being friction fit to a sinker for connection with said attachment sleeve tubing.

10. The apparatus of claim 6, wherein the second end of said attachment sleeve tubing frictionally fits over at least one of a fishing float, a fishing float having an auxiliary lighting device, and a fishing sinker.

11. A slip clip apparatus for use on a fishing line said slip clip apparatus comprising:

a sinker;

an insertion body having a left portion and right portion;

a clip body, said clip body having a U shaped arm having a proximal end, a bottom, and a distal end, said proximal end of the U shaped arm connected at said left portion of said insertion body, said distal end of said U shaped arm at least aligned with said right portion of said insertion body, and said bottom of said U shaped arm opposing said insertion body such that said U shaped arm of said clip body forms a line slip opening for sliding on said fishing line and at least one of said insertion body and a portion of said clip body defines a line passage, said line passage allowing for the removal of said fishing line from said line slip opening away from a terminal end of the fishing line;

a crimp stop that restricts the proximal end of said U shaped arm from contact with said distal end of said U shaped arm;

an elongated attachment sleeve tubing having a first end and a second end opposite of said first end, wherein said first end frictionally fits over said insertion body and only a portion of said clip body and wherein said second end frictionally fits over said sinker;

wherein said attachment sleeve tubing closes said line passage when said attachment sleeve tubing is friction fit over said insertion body;

wherein said insertion body includes a plurality of grip sections for increasing the friction fit between said insertion body and said elongate attachment sleeve;

wherein said plurality of grip sections are substantially aligned with a longitudinal axis of said elongated attachment sleeve; and wherein said elongated attachment sleeve is comprised of a circular cross sectional structure.

12. The apparatus of claim 11, wherein said distal end of said U shaped arm is connected at said right portion of said insertion body.

13. The apparatus of claim 11, wherein said attachment sleeve tubing closes said line passage when said attachment sleeve tubing is friction fit over said insertion body and said distal end of said U-shaped arm.

\* \* \* \* \*